Jan. 29, 1924.
J. PELLKOFER
WOOD DISK WHEEL
Filed April 17, 1922
1,482,252
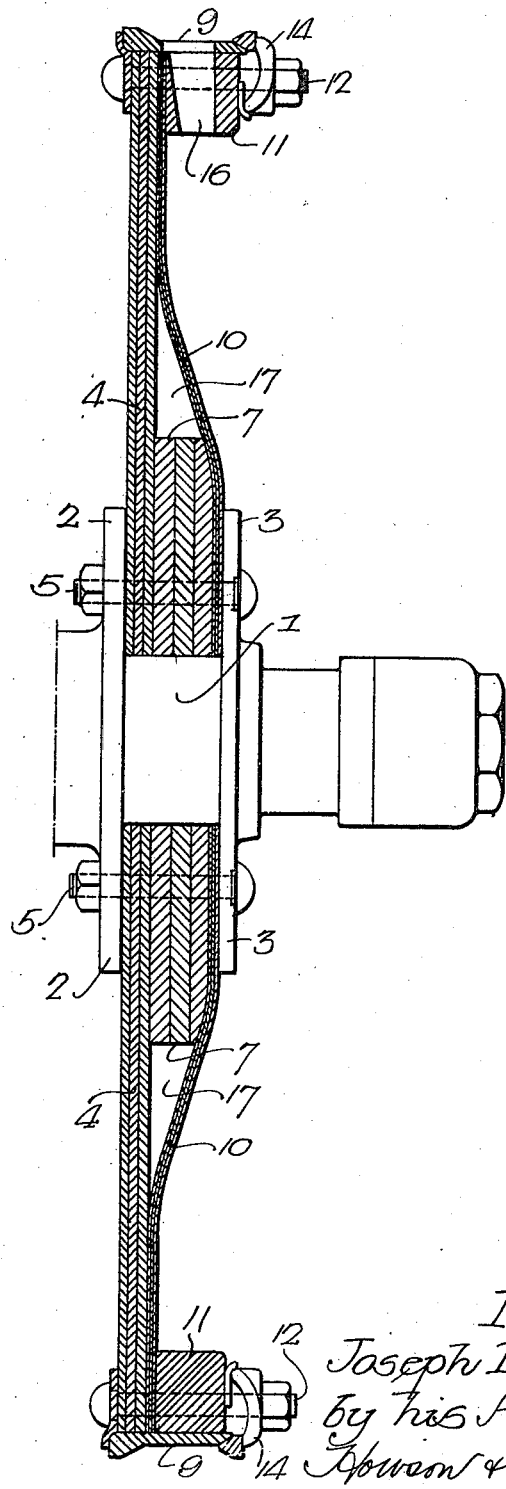
Inventor —
Joseph Pellkofer.
by his Attorneys —
Howson & Howson.

Patented Jan. 29, 1924.

1,482,252

UNITED STATES PATENT OFFICE.

JOSEPH PELLKOFER, OF CLIFTON HEIGHTS, PENNSYLVANIA, ASSIGNOR TO GEORGE W. SMITH & COMPANY, INCORPORATED, OF PHILADELPHIA, PENNSYLVANIA, A CORPORATION OF PENNSYLVANIA.

WOOD DISK WHEEL.

Application filed April 17, 1922. Serial No. 553,362.

*To all whom it may concern:*

Be it known that I, JOSEPH PELLKOFER, a citizen of the United States, residing in Clifton Heights, Pennsylvania, have invented a Wood Disk Wheel, of which the following is a specification.

This invention relates to wood disk wheels, and consists of a laminated wood structure having certain advantageous and improving features of construction hereinafter fully set forth.

The attached drawing shows a vertical section of a wheel made in accordance with my invention.

With reference to the drawing, 1 represents the hub of the wheel, between the flanges 2 and 3 of which is secured by means of bolts 5, 5, the laminated wood structure constituting the wheel. This laminated structure comprises in the present instance a flat laminated disk 4, which abuts the inside flange 2 of the hub, the outer face of the disk constituting the flat inner face of the wheel; a laminated hub element 7, of comparatively small diameter abutting and secured to the disk 4, and a curved laminated disk 10, which is secured to the outer face of the element 7, and at the periphery to the forward face of the disk 4. In the present instance, the element 7 is shown beveled at its outer edge to afford the disk 10 a smooth and gradual curve where it bends inwardly towards the disk 4. Secured to the outer face of the disk 10 at the peripheral edge thereof is a felly 11, to which is secured in suitable manner a rim 9, and through which felly pass bolts 12 which hold clamping elements 14, for a demountable rim (not shown). Extending through the felly 11 is a substantially radial opening 16 for the reception of the valve casing of a pneumatic tire (not shown).

Numerous advantages are found in the construction as hereinbefore described. It will be noted for example that with this construction the air valve of the pneumatic tire after passing through the felly 11 is exposed in much the same manner as in the spoked wheel, the valve, in fact, being more easily accessible in this disk wheel than in the spoked wheel of ordinary construction. This construction of the disk wheel eliminates the requirement for a valve or air pocket having a removable cover, and greatly simplifies both the construction and the manipulation of the valve.

It will also be noted that at the hub the wheel is a solid laminated structure affording greater strength than the solid wood hubs employed with spoked wheels. There is also found in this wheel an air cushion or space 17, which affords superior resiliency in the wheel. The laminated construction of the disks 10 and 6 also insures with a substantially greater resiliency and springiness than is found in the ordinary spoked wheel, a materially increased strength.

A further advantage is found in the flat inner surface of the wheel providing for the brake drums, and the ornamental value is obtained by reason of the curved outer surface.

The application of the wood felly band 11 to the disk wheel in the manner shown affords many structural advantages, while the wood construction with the air space between the disks eliminates all noise in the wheel and allows the desired flexibility.

I claim:

1. A disk wheel comprising a hub element, a flat disk, and a curved disk meeting the said flat disk at its periphery, said disks at their centers abutting opposite sides of said hub whereby an air pocket is formed around the hub.

2. A disk wheel comprising a laminated hub element, a laminated flat disk secured to one side of said hub element and extending beyond the periphery thereof, and a laminated curved disk secured to the front of said hub element and to the face of said flat disk.

3. A disk wheel comprising a laminated hub element, a flat laminated disk secured to one face of said hub element and extending beyond the periphery of the latter, a laminated curved disk secured to the other face of said hub element and to the face of said flat disk, and a circular band secured at the peripheral edge of the curved disk and constituting the felly band of the wheel.

4. A disk wheel comprising a flat laminated disk and a curved laminated disk secured together at their peripheral edges, and a hub element of comparatively small diameter interposed between the said disks at the inner edges thereof and secured thereto, said disks and hub enclosing a sealed air pocket, substantially as and for the purpose set forth.

JOSEPH PELLKOFER,